(12) United States Patent
Glazko et al.

(10) Patent No.: US 7,773,992 B2
(45) Date of Patent: Aug. 10, 2010

(54) TIMING TRANSITIONS BETWEEN WIRELESS COMMUNICATION SYSTEMS

(75) Inventors: Serguei A. Glazko, San Diego, CA (US); Subbarao Yallapragada, San Diego, CA (US); Jiangxin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 12/027,487

(22) Filed: Feb. 7, 2008

(65) Prior Publication Data

US 2008/0125168 A1 May 29, 2008

Related U.S. Application Data

(63) Continuation of application No. 10/062,207, filed on Jan. 31, 2002, now Pat. No. 7,330,735.

(51) Int. Cl.
*H04W 36/00* (2009.01)
*H04W 4/00* (2009.01)

(52) U.S. Cl. .................. 455/436; 455/403; 455/426.1; 455/422.1; 455/423; 455/452.2; 370/331; 370/332; 370/310; 370/277

(58) Field of Classification Search ............... 455/552.1, 455/550.1, 436–453, 502, 435.2, 423, 422.1, 455/403
See application file for complete search history.

(56) References Cited

U.S. PATENT DOCUMENTS

| 5,442,680 A | 8/1995 | Schellinger et al. |
| 5,550,895 A | 8/1996 | Burson et al. |
| 5,551,073 A | 8/1996 | Sammarco |
| 5,574,775 A | 11/1996 | Miller, II et al. |
| 5,870,673 A * | 2/1999 | Haartsen .................. 455/426.1 |
| 5,995,829 A | 11/1999 | Broderick |
| 6,167,270 A * | 12/2000 | Rezaiifar et al. ............ 455/442 |
| 6,185,435 B1 | 2/2001 | Imura |
| 6,449,494 B1 * | 9/2002 | Cashman ................. 455/553.1 |
| 6,466,553 B1 | 10/2002 | Wakamatsu |
| 7,035,309 B2 * | 4/2006 | Sudo et al. .................. 375/130 |
| 2001/0031634 A1 * | 10/2001 | Mizutani et al. ............ 455/425 |

(Continued)

FOREIGN PATENT DOCUMENTS

GB 2355152 4/2001

(Continued)

OTHER PUBLICATIONS

CDMA2000 High Rate Packet Data Air Interface Specification, TIA/EIA/IS-856, Nov. 2000, pp. 1-450.

(Continued)

*Primary Examiner*—Huy Phan
(74) *Attorney, Agent, or Firm*—Kam Ti Tam; Darren M. Simon

(57) ABSTRACT

Interoperability between wireless communication systems, such as the IS2000-1x and IS856 systems, is facilitated by using supervision timers. A wireless communication device starts one or more supervision timers and performs an inter-system transition. When the wireless communication device returns from the transition, the supervision timers are used to estimate the duration of the transition. The wireless communication device then performs a sequence of tasks appropriate to the estimated duration.

19 Claims, 6 Drawing Sheets

U.S. PATENT DOCUMENTS

| | | |
|---|---|---|
| 2002/0019234 A1* | 2/2002 | Wright et al. ............... 455/450 |
| 2002/0037715 A1* | 3/2002 | Mauney et al. ............. 455/421 |
| 2002/0072389 A1 | 6/2002 | Ward et al. |
| 2002/0102976 A1 | 8/2002 | Newbury et al. |
| 2002/0111169 A1 | 8/2002 | Vanghi |
| 2003/0026240 A1 | 2/2003 | Eyuboglu et al. |
| 2003/0123406 A1 | 7/2003 | Yavuz et al. |

FOREIGN PATENT DOCUMENTS

| | | |
|---|---|---|
| WO | 0158046 | 8/2001 |
| WO | 0167794 | 9/2001 |

OTHER PUBLICATIONS

International Search Report—PCT/US03/02908—International Search Authority—European Patent Office—Jun. 6, 2003.

International Preliminary Examination Report—PCT/US03/02908—IPEA/US—Alexandria, Virginia—Apr. 22, 2005.

* cited by examiner

US 7,773,992 B2

TIMING TRANSITIONS BETWEEN WIRELESS COMMUNICATION SYSTEMS

RELATED APPLICATIONS

This patent application is a continuation of U.S. patent application Ser. No. 10/062,207 entitled "TIMING TRANSITIONS BETWEEN WIRELESS COMMUNICATION SYSTEMS", filed on Jan. 31, 2002, now U.S. Pat. No. 7,330,735, which is assigned to the assignee hereof and is hereby expressly incorporated by reference herein.

FIELD

Various embodiments relate to wireless communications and, more particularly, to intersystem operations within wireless communications systems.

BACKGROUND

Wireless communication systems are widely deployed to provide various types of communication, such as voice and data communications. These systems may be based on a variety of modulation techniques, such as code division multiple access (CDMA), time division multiple access (TDMA), or frequency division multiple access (FDMA). A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

A CDMA system that supports that cdma2000 standard may include support for a number of specifications, including, for example, the IS856 specification for high data rate (HDR) wireless communications, also known as the 1xEV specification, and the IS2000-1x specification for voice and data communications.

The IS856 standard provides high data rate services to data only wireless communication devices (WCDs) or to WCDs known as hybrid access terminals (HATs), which support multiple standards, possibly including the IS2000-1x standard. An IS856-compliant system can be co-located or overlaid in some other manner with an IS2000-1x network to provide enhanced high-speed data services. The separation between the IS856 and IS2000-1x systems is realized in the frequency domain in a similar manner to the separation between cdma2000 system channels. The IS856 and IS2000-1x standards, however, do not provide for compatibility between the two systems.

SUMMARY

In general, this disclosure is directed to various techniques that can be implemented within a wireless communication system. In one embodiment, a timer defined for use within a first wireless communication system is started. A duration of a transition from the first wireless communication system to a second wireless communication system is estimated as a function of the timer.

Other embodiments are directed to processor-readable media and apparatuses embodying these techniques. For example, one embodiment is directed to a wireless communication device that includes first wireless communication system hardware for operating in a first wireless communication system and second wireless communication system hardware for operating in a second wireless communication system. An interoperation module configures the wireless communication device in response to a transition between the first and second wireless communication systems. The interoperation module is configured to estimate a duration of the transition as a function of a supervision timer.

Additional details of various embodiments are set forth in the accompanying drawings and the description below. Other features, objects and advantages will become apparent from the description and drawings, and from the claims.

DETAILED DESCRIPTION

In general, the invention facilitates interoperability between wireless communication systems by using supervision timers to assist in monitoring the systems. Various embodiments provide a WCD that can operate in at least two communication systems, such as the IS2000-1x and IS856 (HDR) systems. In some embodiments, one or more supervision timers provided by the IS856 standard may be used to estimate the duration of a transition from the IS856 system to another system, such as the IS2000-1x system. The WCD may then perform a sequence of tasks appropriate to the estimated duration of the transition. By using supervision timers to estimate the duration of a transition to the IS2000-1x or other system, efficient transition-related task execution is promoted. Because the supervision timers and appropriate responses to supervision timer conditions are defined in the IS856 standard, this technique presents little, if any, impact to either communication system.

Figure 1:
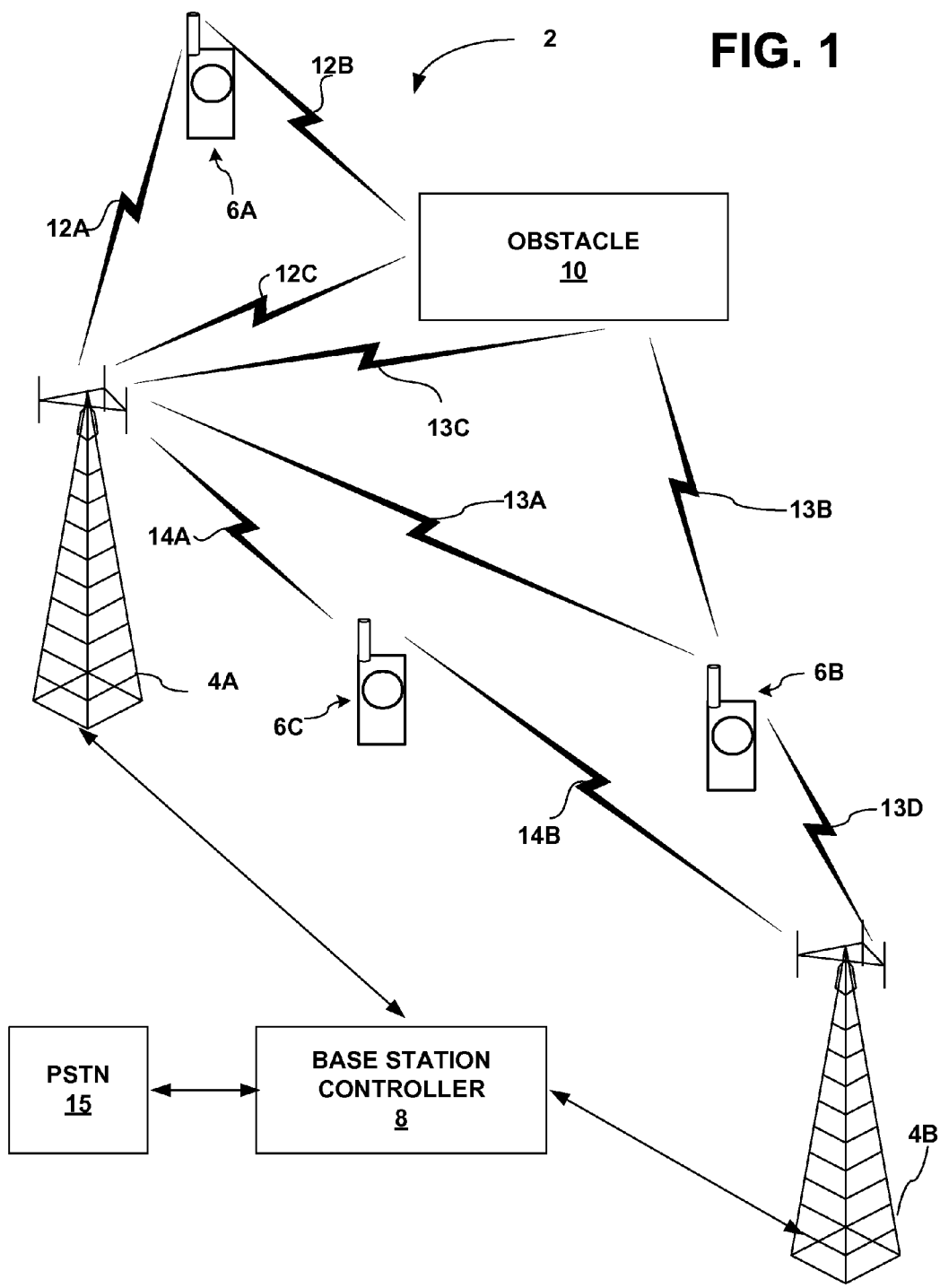
FIG. 1 is a block diagram illustrating a wireless communication system.

FIG. 1 is a block diagram illustrating an example spread spectrum wireless communication system 2, in which base stations 4 transmit signals 12-14 to WCDs 6 via one or more paths. In particular, base station 4A transmits signal 12A to WCD 6A via a first path, as well as signal 12C, via a second path caused by reflection of signal 12B from obstacle 10. Obstacle 10 may be any structure proximate to WCD 6A such as a building, bridge, car, or even a person.

Base station 4A also transmits signal 13A to WCD 6B via a first path from base station 4A, as well as signal 13C via a second path caused by reflection of signal 13B from obstacle 10. In addition, base station 4A transmits signal 14A to WCD 6C. WCDs 6 may implement what is referred to as a RAKE receiver to simultaneously track the different signals received from different base stations and/or from the same base station but via different paths. System 2 may include any number of WCDs and base stations. For example, as illustrated, another base station 4B receives signal 13D from WCD 6B. In addition, base station 4B receives signal 14B from WCD 6C.

System 2 may be designed to support one or more CDMA standards including, for example, (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), (5) the HDR system documented in TIA/EIA-IS-856, "CDMA2000 High Rate Packet Data Air Interface Specification, and (6) some other standards. In addition, system 2 may be designed to support other standards, such as the GSM standard or related standards, e.g., the DCS1800 and PCS1900 standards. GSM systems employ a combination of FDMA and TDMA modulation techniques. System 2 may also support other FDMA and TDMA standards.

WCDs 6 may be implemented as any of a variety of wireless communication devices such as, for example, a cellular radiotelephone, a satellite radiotelephone, a PCMCIA card incorporated within a portable computer, a personal digital assistant (PDA) equipped with wireless communication capabilities, and the like. Base stations 4 (sometimes referred to as base transceiver systems, or BTSs) are typically connected to a base station controller (BSC) 8 to provide an interface between base stations 4 and a public switched telephone network 13.

In some embodiments, one or more WCDs 6 may be implemented as a hybrid access terminal (HAT) that supports multiple systems. For example, a WCD 6 may support the 1x-CDMA2000 standard for voice communications and the IS856 standard for high-speed data communications. The IS856-compliant system can be co-located or overlaid in some other manner with the 1x-CDMA2000 network to provide enhanced high-speed data services. Separation between the systems may be realized in the frequency domain, much as system channels within the 1x-CDMA2000 system are separated. While neither system provides backward-compatibility with the other and no specific messaging protocol exists in both systems to assist interoperation, service can be provided on both systems. In this way, WCDs 6 can benefit from advantages available on either network.

To support both standards simultaneously, a WCD 6 must perform efficient dual-system monitoring. Further, some interoperation tasks require compliance with both standards simultaneously. As described below in connection with FIGS. 2-6, WCD 6 uses timers provided in the IS856 standard to facilitate efficient dual-system monitoring and inter-system transitions.

Figure 2:
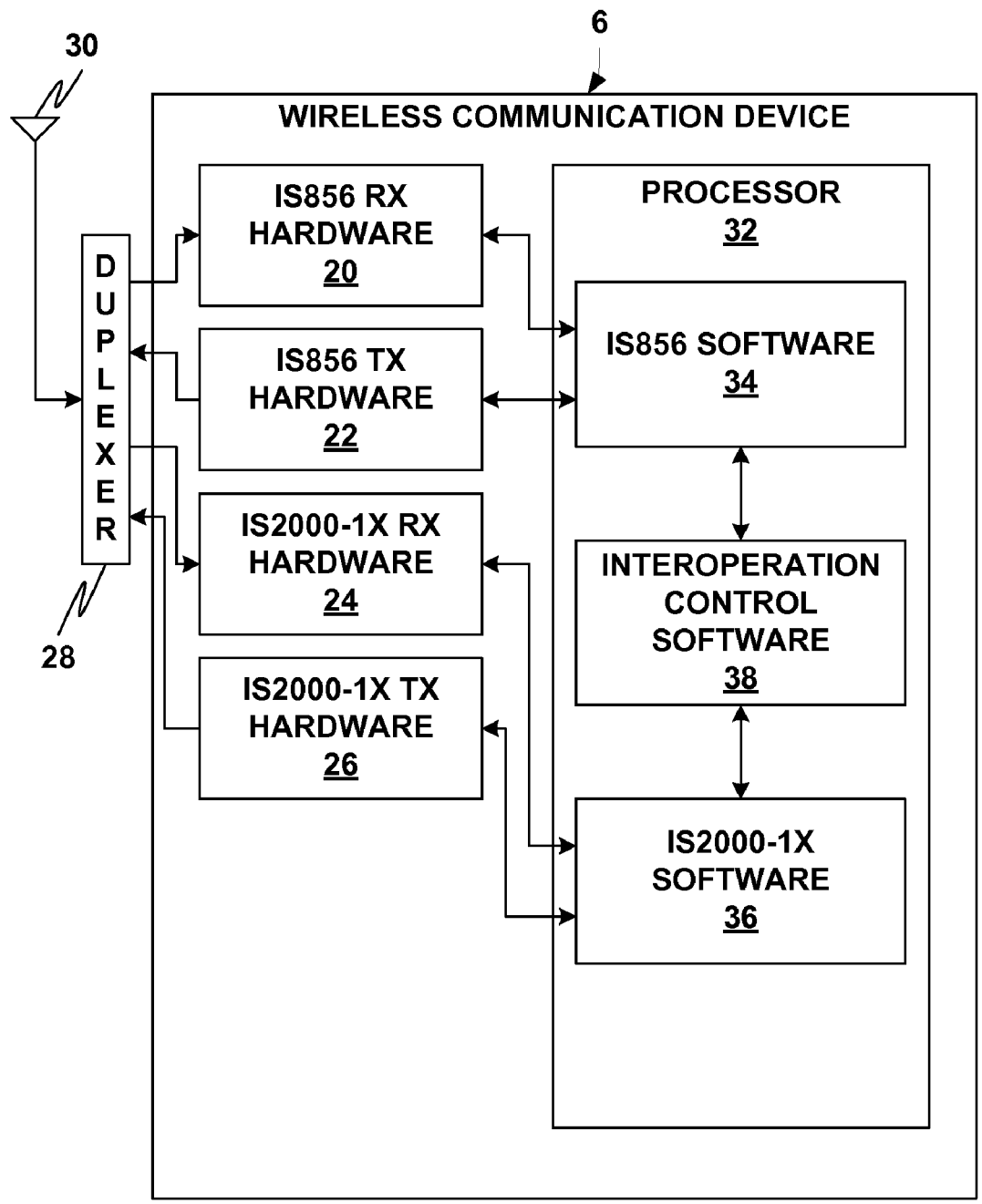
FIG. 2 is a block diagram depicting an example implementation of a WCD.

FIG. 2 illustrates an example implementation of a WCD 6 that supports multiple systems. As depicted in FIG. 2, WCD 6 supports the 1x-CDMA2000 (IS2000-1x) and IS856 standards. Several modes of interoperability may be supported. For example, in a data-only mode, WCD 6 operates in an IS856 system only. In another mode, WCD 6 supports both IS2000-1x voice and IS856 data services without priority to either network. Other modes may be defined to accommodate differing user needs.

In particular, WCD 6 includes IS856 receiver hardware 20 and IS856 transmitter hardware 22 for receiving and transmitting data communications at high speeds. WCD 6 also includes IS2000-1x receiver hardware 24 and IS2000-1x transmitter hardware 26 for receiving and transmitting voice communications. A duplexer 28 performs duplexing to allow the receiver hardware and the transmitter hardware to share a single antenna 30.

A controller 32 controls the operation of IS856 receiver hardware 20, IS856 transmitter hardware 22, IS2000-1x receiver hardware 24, and IS2000-1x transmitter hardware 26. In particular, controller 32 may include a processor that executes IS856 control and processing software 34 to control the operation of IS856 receiver hardware 20 and IS856 transmitter hardware 22. Controller 32 also executes IS2000-1x control and processing software 36 to control the operation of IS2000-1x receiver hardware 24 and IS2000-1x transmitter hardware 26. In some embodiments, some software routines may be shared between IS856 control and processing software 34 and IS2000-1x control and processing software 36 for optimization purposes. Similarly, in some embodiments, some hardware components may be shared between IS856 receiver hardware 20 and IS2000-1x receiver hardware 24, or between IS856 transmitter hardware 22 and IS2000-1x transmitter hardware 26.

To support both the IS856 and IS2000-1x systems, WCD 6 must perform inter-system transitions, i.e., transitions between the two systems, for maintenance and call support tasks. To facilitate inter-system transitions, controller 32 executes interoperation control software 38 that performs a number of tasks associated with transitions between the two systems. These tasks may include, for example, physical tuning to another frequency or CDMA channel, and switching hardware blocks and firmware to perform tasks associated with physical layer processing for a particular standard. Interoperation control software 38 also loads and executes IS856 control and processing software 34 and IS2000-1x control and processing software 36, as appropriate, to control the receiver and transmitter hardware. Interoperation control software 38 may also load and execute software routines for performing higher layer processing.

According to various embodiments, certain supervision timers defined in the IS856 standard are used to coordinate these tasks. These timers prevent premature declaration of some supervision failures or attempt failures so as to allow WCD 6 to continue operations. On the other hand, expiration of an IS856 supervision timer suggests that the condition under which the supervision or attempt failure occurred is probably non-transient and that a new set of actions may be appropriate. IS856 supervision timers also allow efficient resource deallocation under certain circumstances. In some embodiments, the IS856 supervision timers are also used to indicate to WCD 6 which action or actions are required after controller 32 performs an inter-system transition.

Inter-system transitions may be characterized as "on-command" transitions or as static transitions. Controller 32 performs on-command transitions when necessary to accomplish certain tasks, such as updating of pilot strength information or acquisition of an IS856 system after failing to acquire an IS2000-1x system within a prescribed time limit. Static transitions are periodic transitions made to either system for maintenance purposes.

Figure 3:
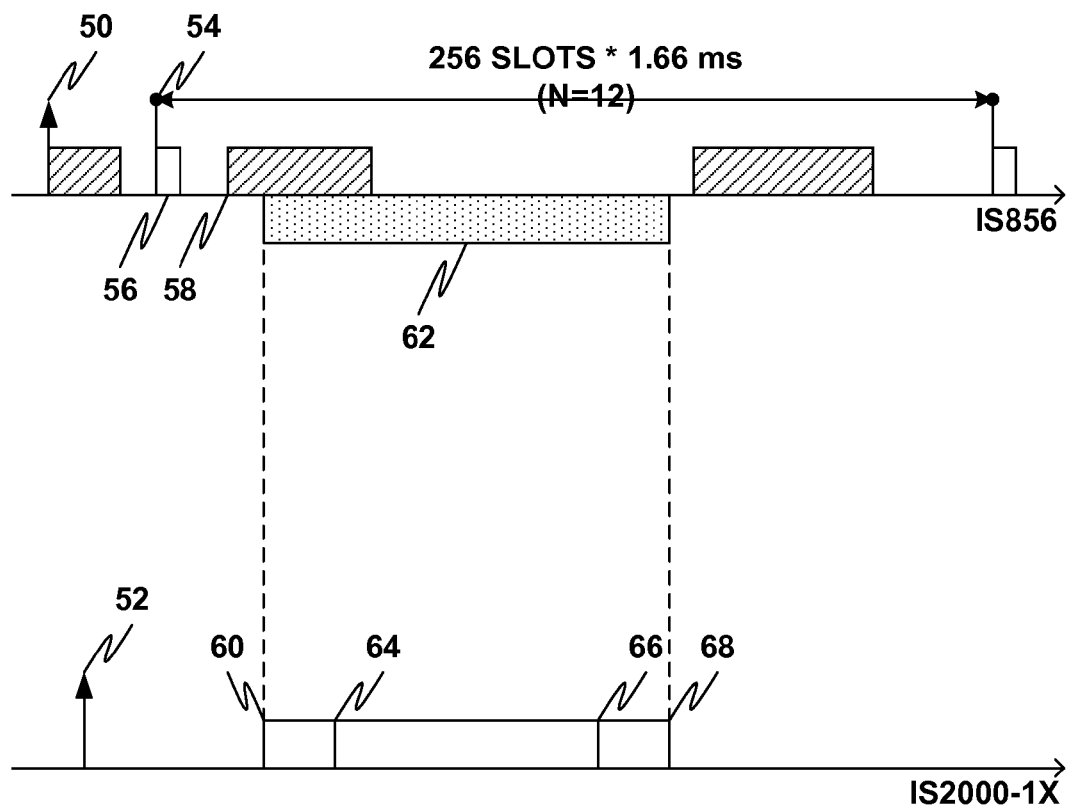
FIG. 3 is a timing diagram illustrating interoperation timing relationships of a WCD in a connected mode.
Figure 4:
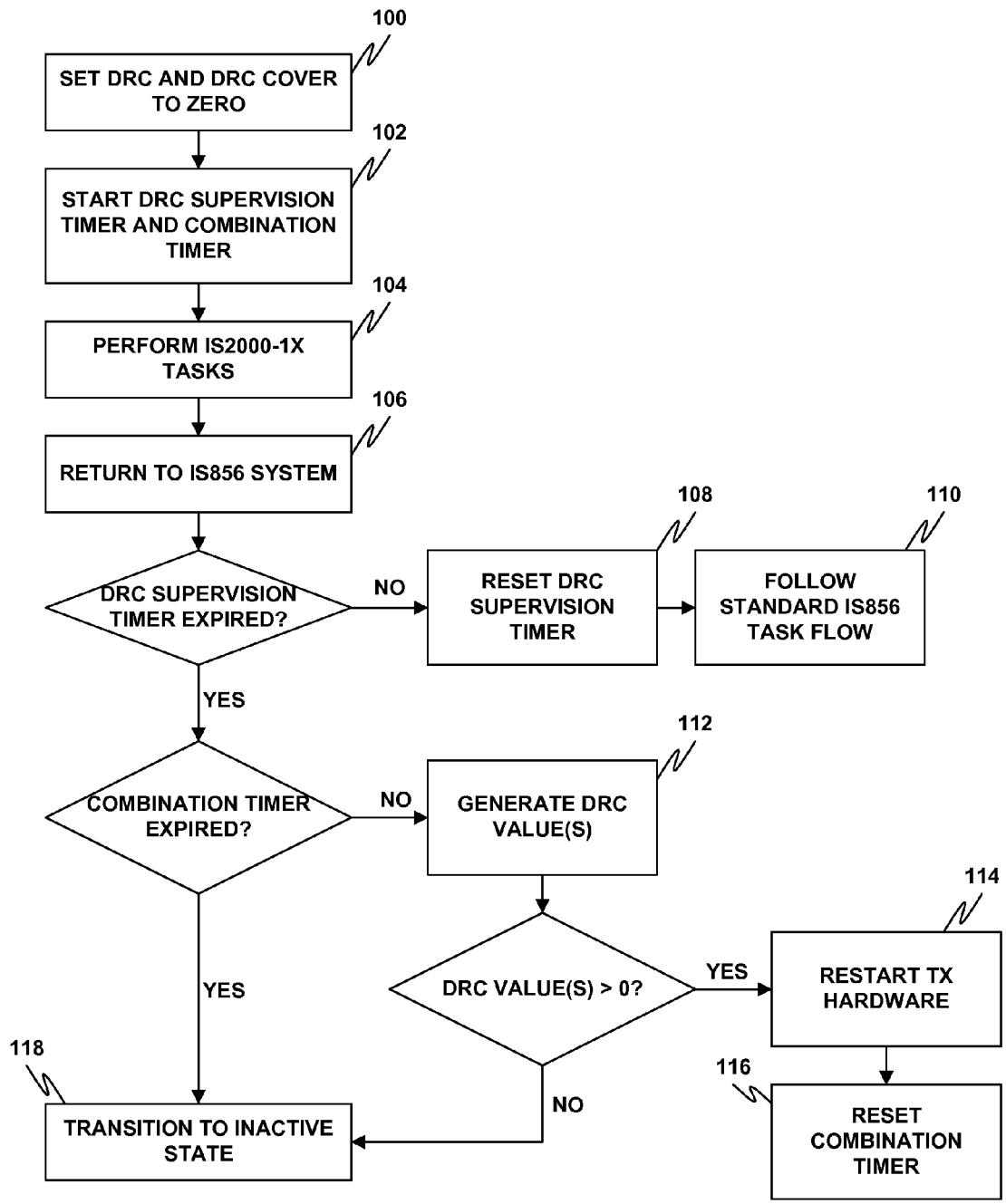
FIG. 4 is a flow diagram illustrating interoperation of a WCD in a connected mode.
Figure 5:
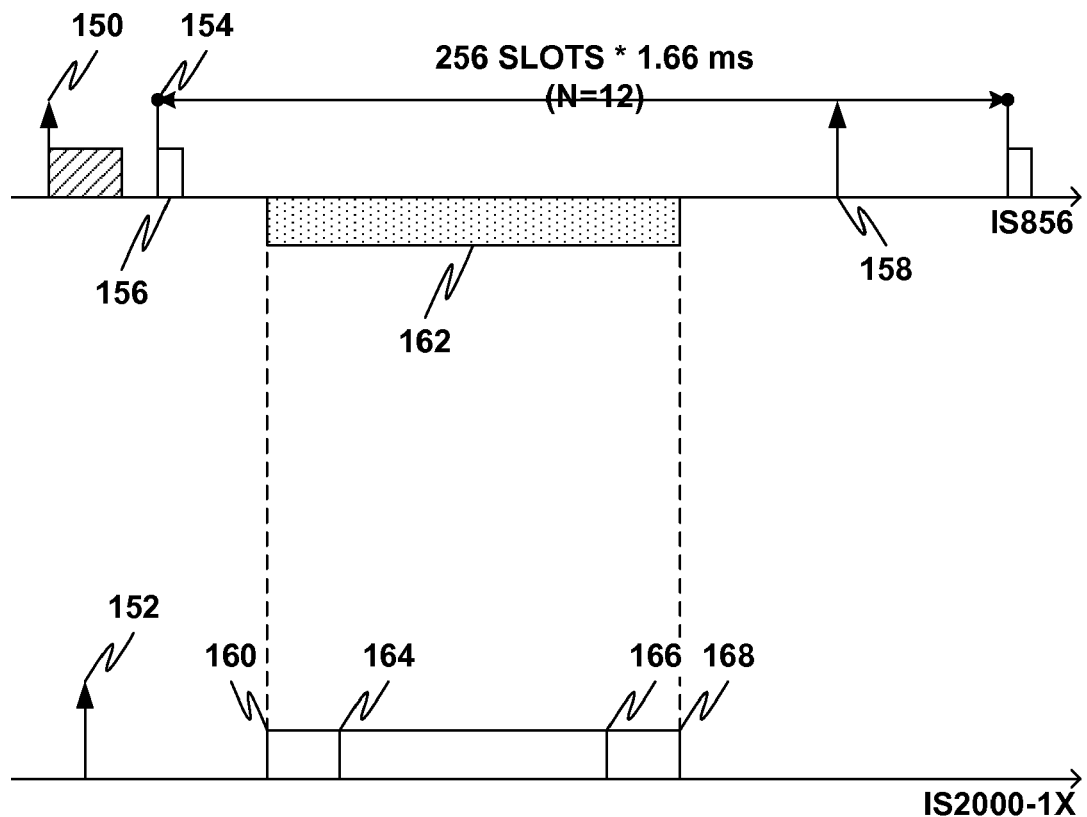
FIG. 5 is a timing diagram illustrating interoperation timing relationships of a WCD in an idle mode.
Figure 6:
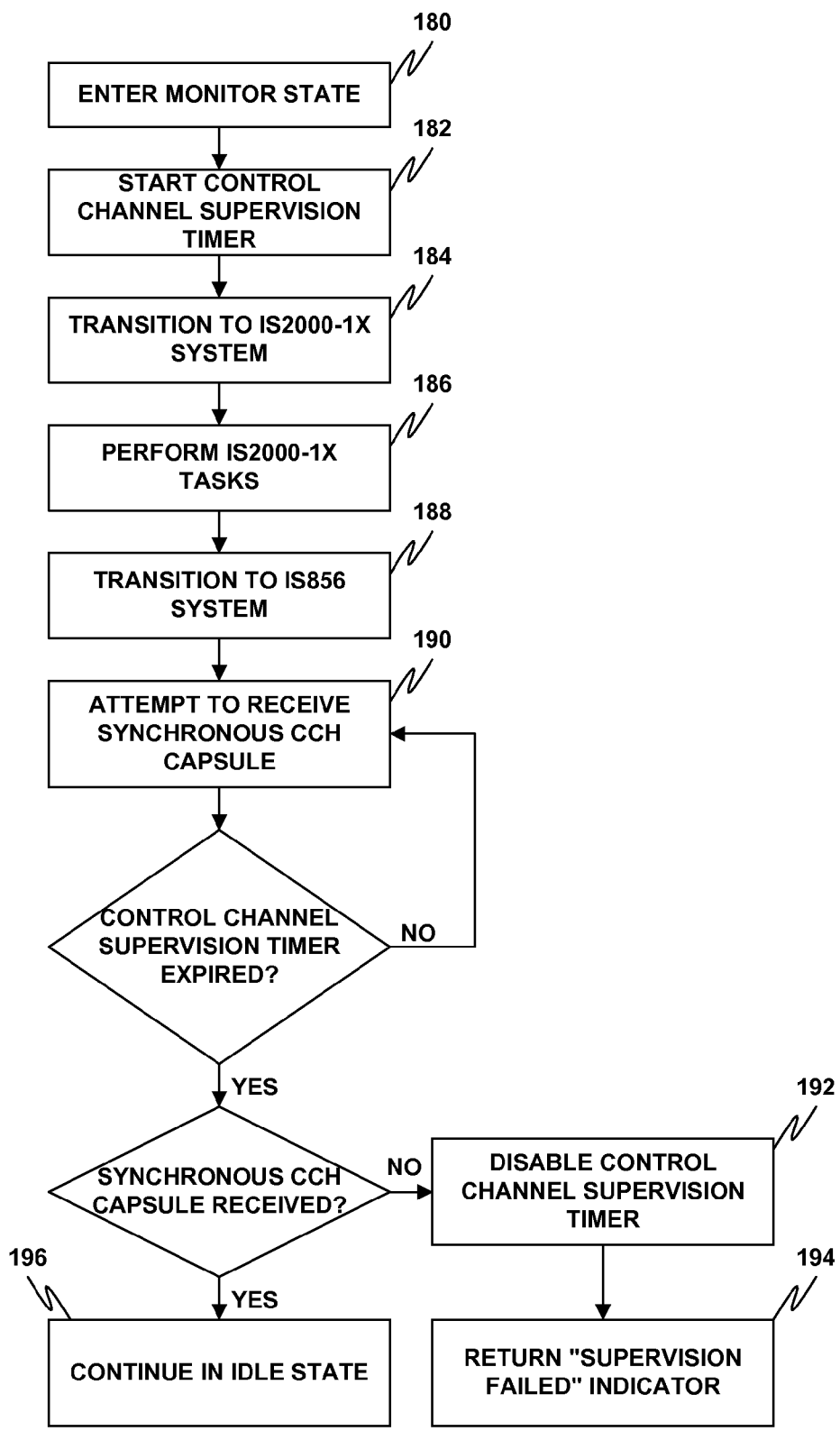
FIG. 6 is a flow diagram illustrating interoperation of a WCD in an idle mode.

Static transitions may be further characterized according to whether WCD 6 is connected or idle in the IS856 system. This determination affects the manner in which controller 32 performs a static transition. When WCD 6 is assigned Forward and Reverse Traffic Channels and receives and transmits data in the IS856 system, WCD 6 is in a connected mode. FIGS. 3-4 illustrate interoperation of WCD 6 in the connected mode. When, on the other hand, WCD 6 is not receiving or transmitting any data in the IS856 system and only monitors Control Channel messages in the IS856 system, WCD 6 is in an idle mode in the IS856 system. FIGS. 5-6 illustrate interoperation of WCD 6 in the idle mode.

FIG. 3 is a timing diagram illustrating interoperation timing relationships of WCD 6 when connected in the IS856 system and idle in the IS2000-1x system. In this mode of operation, WCD 6 operates in a slotted paging mode in the IS2000-1x system. In the slotted paging mode, the base station sends paging signals only within assigned paging slots separated by predetermined time intervals. Slotted paging allows WCD 6 to operate in a sleep mode during the period of time between consecutive paging slots without missing paging signals. With WCD 6 in an active HDR session in the IS856 system and in a slotted paging mode in the IS2000-1x system, two timelines are of interest. In FIG. 3, the upper timeline illustrates the timing of events in the IS856 system, while the lower timeline illustrates the timing of events in the IS2000-1x system.

In the IS856 system timeline, a point 50 represents the IS856 system time derived from the earliest arriving symbol demodulated by WCD 6. WCD 6 may incorporate a RAKE receiver having a number of demodulation fingers to track a multi-path signal. Similarly, a point 52 in the IS2000-1x system timeline represents the IS2000-1x system time. In this case, WCD 6 derives the IS2000-1x system time in the typical manner for the slotted paging mode. The time difference between points 50 and 52 represents the potential system time difference between the two timeliness. At point 50, WCD 6 receives traffic channel data, and at a point 54 WCD 6 receives a synchronous capsule (SC) 56 of a control channel message. At a point 58, a new data transmission is started by an access network (AN), analogous to a base station in an IS2000-1x system. During this data transmission, an action timer set on the IS856 system commands WCD 6 to prepare a static transition to the IS2000-1x system. WCD 6 performs several actions in connection with this transition, including setting the data rate control (DRC) cover and DRC value appropriately in advance to ensure that all multiple slot interlaced transmissions are received no later than a point 60.

Point 60 represents a wake-up point for the IS2000-1x system. In addition, point 60 represents the beginning of a period of "away" slots 62 for the IS856 system. Away slots 62 occur when WCD 6 is awake in the IS2000-1x mode and is performing tasks associated with the IS2000-1x system. WCD 6 is unavailable for IS856-related tasks during away slots 62. Accordingly, WCD 6 takes certain precautions, described below in connection with FIG. 4, to ensure predictable operation of WCD 6 during these unavailable away slots 62.

The time interval between points 60 and 64 represents time allocated for hardware and software overhead in preparation for receiving a signal on the slotted paging channel. If no RF warm-up is needed, point 60 may be moved closer to the actual beginning of the paging channel slot indicated by point 64. The paging channel slot ends at a point 66. The time interval between points 66 and 68 represents time allocated for hardware and software overhead after the end of the paging channel slot. At point 68, WCD 6 returns to the idle mode in the IS2000-1x system. Once WCD 6 transitions to the IS2000-1x system, WCD 6 performs all of the tasks governed by IS2000-1x control and processing software 36 of FIG. 2 until point 68. The duration of away slots 62 runs from point 60 to point 68, i.e., the entire length of the paging channel slot and the hardware and software overhead before and after the paging channel slot. The duration of away slots 62 can be estimated generally but cannot be predicted to a high degree of accuracy.

Several events may affect the duration of away slots 62. For example, if the pilot search is successful, i.e., if a pilot is found and WCD 6 has overhead information for the sector in which WCD 6 is located, WCD 6 does not need to update its overhead information. As a result, the duration of away slots 62 may be decreased. The duration of away slots 62 may also be decreased when no message is directed to WCD 6 on the paging channel or when no action needs to be performed in connection with a paging message received on the paging channel.

On the other hand, the duration of away slots 62 may be increased if the pilot search is unsuccessful, i.e., if WCD 6 fails to find any signal paths from the active or selected neighbor sectors in a period of time allocated for searching before the actual paging channel slot. In this case, WCD 6 must enter a non-slotted mode of operation. WCD 6 may also enter the non-slotted mode for other reasons, such as responding to a voice page. In this case, the duration of away slots 62 cannot be predicted, and IS856 operations are suspended until WCD 6 re-enters the slotted mode, i.e., the sleep state, in the IS2000-1x system.

When WCD 6 is operating in the IS2000-1x mode, WCD 6 does not attempt any actions related to the IS856 system until WCD 6 returns to the sleep mode in the IS2000-1x system at point 66. Accordingly, the next transition to the IS856 system occurs at point 68. The actions taken by WCD 6 at point 68 may depend on the time elapsed between points 60 and 68, i.e., the duration of away slots 62. To determine a set of appropriate actions that should be taken by WCD 6 upon returning to the IS856 system, WCD 6 can use supervision timers available in the IS856 mode. Because the IS856 standard specifies the actions to be taken in response to the supervision timers, IS856 control and processing software 34 of FIG. 2 contains the routines needed to perform these actions. Accordingly, no knowledge of the state of the IS2000-1x system is required.

FIG. 4 is a flow diagram illustrating an example sequence of actions performed by interoperation control software 38 of FIG. 2 in connection with monitoring the paging channel in the IS2000-1x system. Before transitioning to the IS2000-1x system to monitor the paging channel, interoperation control software 38 sets a data rate control (DRC) value to zero and a DRC cover to zero (100). Setting these values to zero is analogous to treating the transition to the IS2000-1x system as short-term channel degradation in the IS856 system. That is, setting these values to zero simulates decreased signal quality in the forward link, i.e., the link from the base station to WCD 6. As required by the IS856 standard, when the DRC is set to zero, interoperation control software 38 starts a DRC supervision timer (102), which runs for a duration of 240 milliseconds (ms). The DRC supervision timer can be set simultaneously with a transition to the IS2000-1x system, even though the actual DRC value computed by WCD 6 for the slot prior to transition may not be zero.

WCD 6 then performs IS2000-1x related tasks (104) as controlled by IS2000-1x control and processing software 36 and returns to the IS856 system (106). The DRC supervision timer allocates 240 ms for WCD 6 to transmit at least one non-zero DRC value while the DRC supervision timer is still running. If a non-zero DRC value is transmitted indicating an improved forward link condition before the DRC supervision timer expires, interoperation control software 38 resets the DRC supervision timer, as specified by the IS856 standard (108). Notably, if WCD 6 returns from the IS2000-1x system before the DRC supervision timer has expired, WCD 6 may attempt to send a non-zero DRC value and continue in the same state in which it transitioned from the IS856 system, following the standard IS856 task flow (110).

If, on the other hand, WCD 6 returns from the IS2000-1x system after expiration of the DRC supervision timer, i.e., if the IS2000-1x tasks took longer than 240 ms, WCD 6 may use another IS856 timer to indicate a set of alternative tasks. Another such timer that can be used in combination with the DRC supervision timer is the Reverse Channel Traffic Restart Timer, also defined by the IS856 standard. The Reverse Channel Traffic Restart Timer runs for 12 control channel cycles, or 5.12 seconds. In parallel with starting the DRC supervision timer, interoperation control software 38 also starts a combination timer (102) that runs for the combined duration of the DRC supervision timer and the Reverse Channel Traffic Restart Timer. Accordingly, the combination timer extends the Reverse Channel Traffic Restart Timer length as specified by the IS856 standard by the length of the DRC supervision timer. In most cases, the combination timer should give WCD 6 enough time to perform common tasks associated with slotted paging channel monitoring in the IS2000-1x system during either static or on-command transitions. Thus, WCD 6 is usually able to transition back to the IS856 system before the combination timer expires. In this case, WCD 6 computes consecutive DRC values for the most recent slot and for a programmable number of subsequent slots (112). If the DRC values are not zero, WCD 6 may restart IS856 transmitter hardware 22 (114) and reset the combination timer (116). The IS856 standard requires that sixteen consecutive non-zero DRC values be generated before restarting IS856 transmitter hardware 22. However, because the combination timer was not started in response to actual degradation in the forward link, compliance with this requirement is not necessary. Accordingly, the number of consecutive DRC values that are computed may be set to less than sixteen. In one embodiment, WCD 6 only generates one non-zero DRC value before restarting IS856 transmitter hardware 22.

If the combination timer expires before WCD 6 returns from the IS2000-1x system, or if the specified number of consecutive non-zero DRC values is not generated, WCD 6 transitions into an inactive state with a "supervision failed" indication (118). It is assumed that in this state WCD 6 has no forward traffic channel (FTC) assigned, and most likely will have to go through the connection set-up routines. In some cases, WCD 6 may be required to go back to a network acquisition state.

In this manner, transitions between the IS856 system and IS2000-1x systems are governed by supervision timers specified by the IS856 standard. Interoperation software 38 uses these timers to determine an appropriate sequence of transition tasks based on the duration of away slots 62 of FIG. 3. As described above, the transition tasks performed by WCD 6 upon returning to the IS856 system are determined by whether the transition to the IS856 system occurs before expiration of the DRC supervision timer, after expiration of the DRC supervision timer but before expiration of the combination timer, or after expiration of the combination timer.

When WCD 6 is not receiving or transmitting any data in the IS856 system and only monitors Control Channel messages in the IS856 system, WCD 6 is in an idle mode in the IS856 system. Interoperation in the idle mode involves simpler requirements as compared to the connected mode described above in connection with FIGS. 3-4. FIG. 5 is a timing diagram illustrating interoperation timing relationships of WCD 6 in the idle mode. In FIG. 5, the upper timeline illustrates the timing of events in the IS856 system, while the lower timeline illustrates the timing of events in the IS2000-1x system.

In the IS856 system timeline, a point 150 represents the IS856 system time derived from the earliest arriving finger demodulated by WCD 6. Similarly, a point 152 in the IS2000-1x system timeline represents the IS2000-1x system time. In this case, WCD 6 derives the IS2000-1x system time in the typical manner for the slotted paging mode. The time difference between points 150 and 152 represents the potential system time difference between the two timelines. At point 150, WCD 6 receives traffic channel data, and at a point 154 WCD 6 receives a synchronous capsule (SC) 156 of a control channel message. A dormancy timer may be started after the traffic channel data is received to indicate when WCD 6 has returned to the IS2000-1x system and stopped monitoring both systems for control or paging messages. If the dormancy timer expires at a point 158, WCD 6 will have been idle in the IS856 system for enough time to assume that no more data exchange is occurring, and that WCD 6 can conserve power by operating in the IS2000-1x system only. If WCD 6 subsequently needs to transmit data, WCD 6 can use an on-command transition to transition back to the IS856 system.

Before the dormancy timer expires, however, WCD 6 continues to monitor both the IS856 and IS2000-1x systems, as additional data may be exchanged. During this time, WCD 6 may perform one or more transitions between the IS856 and IS2000-1x systems to monitor the slotted paging channel. When the dormancy timer expires at point 158, WCD 6 either remains on the IS2000-1x system or transitions to the IS2000-1x system and remains there.

Point 160 represents a wake-up point for the IS2000-1x system. In addition, point 160 represents the beginning of a period of "away" slots 162 for the IS856 system. Away slots 162 occur when WCD 6 is awake in the IS2000-1x mode and is performing tasks associated with the IS2000-1x system. WCD 6 is unavailable for IS856-related tasks during away slots 162.

The time interval between points 160 and 164 represents time allocated for hardware and software overhead in preparation for receiving a signal on the slotted paging channel. Because no RF warm-up is needed, point 160 may be moved closer to the actual beginning of the paging channel slot indicated by point 164. The paging channel slot ends at a point 166. The time interval between points 166 and 168 represents time allocated for hardware and software overhead after the end of the paging channel slot. At point 168, WCD 6 returns to the idle mode in the IS2000-1x system. Once WCD 6 transitions to the IS2000-1x system, WCD 6 performs all of the tasks governed by IS2000-1x control and processing software 36 of FIG. 2 until point 168. The duration of away slots 162 runs from point 160 to point 168, i.e., the entire length of the paging channel slot and the hardware and software overhead before and after the paging channel slot. The duration of away slots 162 can be estimated generally but cannot be predicted to a high degree of accuracy.

FIG. 6 is a flow diagram illustrating an example sequence of actions performed by interoperation control software 38 of FIG. 2 in connection with monitoring the paging channel in the IS2000-1x system. As specified by the IS856 standard, in the idle mode, WCD 6 monitors synchronous Control Channel (CCH) capsules. Accordingly, WCD 6 takes advantage of the Control Channel Supervision Timer defined in the IS856 standard when operating in the idle mode, rather than the DRC supervision timer or the Reverse Channel Traffic Restart Timer. The Control Channel Supervision Timer is started (180) when WCD 6 enters a monitor state defined in the Default Idle State Protocol of the IS856 standard (182). In this state, WCD 6 monitors the CCH, listens for paging messages and, if necessary, updates the parameters received from the Overhead Message Protocol.

When operating in the idle mode, WCD 6 may periodically transition between the monitor state and a sleep state in which some subsystems may be shut down to conserve power. In the monitor state, WCD 6 attempts to demodulate synchronous CCH capsules. While the dormancy timer is still active, when WCD 6 is monitoring both the IS2000-1x and IS856 systems, interoperation control software 38 may start the Control Channel Supervision Timer immediately before transitioning to the IS2000-1x system (184). If WCD 6 is in the sleep state as defined in the Default Idle State Protocol of the IS856 standard, WCD 6 may start the timer when WCD 6 is scheduled to transition to the monitor state on the IS856 system rather than immediately before the transition to the IS2000-1x system. In both cases, interoperation control software 38 may start the Control Channel Supervision Timer at the point of transition to the IS2000-1x system, but the length of the timer can be adjusted accordingly. That is, the timer length can be increased by the amount by which WCD 6 would have remained in the sleep state if it did not have to transition to the IS2000-1x system.

WCD 6 then performs IS2000-1x related tasks (186) as controlled by IS2000-1x control and processing software 36 and returns to the IS856 system (188). When WCD 6 returns to the IS856 system, interoperation control software 38 checks the status of the Control Channel Supervision Timer to determine the action that should be taken. If WCD 6 returns to the IS856 system before the timer expires, WCD 6 attempts to receive a synchronous CCH capsule (190) until the timer expires. If WCD 6 cannot receive a valid synchronous CCH capsule before the timer expires, WCD 6 disables the Control Channel Supervision Timer (192) and returns a "supervision failed" indicator (194). If WCD 6 does receive a valid synchronous CCH capsule, WCD 6 continues to operate in the idle state (196). The time spent in the IS2000-1x system is ultimately included in the total time allocated for WCD 6 to receive a valid CCH capsule.

If the Control Channel Supervision Timer expires before WCD 6 returns from the IS2000-1x system or shortly thereafter, WCD 6 is given at least one additional attempt to demodulate the next CCH synchronous capsule even beyond expiration of the timer. Depending on the result of this attempt, WCD 6 either continues in the idle state (196) or issues a "supervision failed" indicator (194) and transitions to a Network Acquisition State as defined in the IS856 standard. WCD 6 then follows rules specified by the IS856 standard from this point on.

On-command transitions are handled similarly to the static transitions described above in connection with FIGS. 3-6. Certain types of on-command transitions may be optimized to the tasks for which they are scheduled to perform. For example, an on-command transition from the IS2000-1x system to the IS856 system to update pilot strength information may be optimized by performing a pilot search after transitioning back to the IS2000-1x system.

Instructions for causing a processor provided in WCD 6, such as controller 32, may be stored on processor-readable media. By way of example, and not limitation, processor-readable media may comprise storage media and/or communication media. Storage media includes volatile and nonvolatile, removable and fixed media implemented in any method or technology for storage of information such as processor-readable instructions, data structures, program modules, or other data. Storage media may include, but is not limited to, random access memory (RAM), read-only memory (ROM), EEPROM, flash memory, fixed or removable disc media, including optical or magnetic media, or any other medium that can be used to store the desired information and that can be accessed by a processor within WCD 6.

Communication media typically embodies processor-readable instructions, data structures, program modules, or other data in a modulated data signal, such as a carrier wave, or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

While various embodiments have been described, modifications may be made without departing from the spirit and scope of the invention. For example, while several embodiments have been described in the context of interoperation between the IS856 and IS2000-1x systems, other embodiments may provide interoperability between other systems. These and other embodiments are within the scope of the following claims.

The invention claimed is:

1. A method for transitioning between a first communications system and a second communications system, comprising:
   simulating a decrease in signal quality of a forward link while operating in the first communications system;
   starting a first timer with a first time period and a second timer with a second time period, wherein the first timer and the second timer are associated with the first communications system;
   transitioning to the second communications system;
   performing one or more tasks associated with monitoring a paging channel of the second communications system; and
   transitioning to an inactive state if the one or more tasks are not performed before the expiration of the combination of the first time period and the second time period.

2. The method of claim 1, wherein the decrease in signal quality is simulated by setting a data rate control (DRC) value and a DRC cover to zero.

3. The method of claim 1, wherein the first communications system is a data communications system.

4. The method of claim 1, wherein the second communications system is a voice communications system.

5. The method of claim 1, wherein the first timer is a DRC supervision timer.

6. The method of claim 1, wherein the second timer is a Reverse Channel Traffic Restart Timer.

7. A wireless device for transitioning between a first communications system and a second communications system, comprising:
   a processor;
   memory in electronic communication with the processor; and
   instructions stored in the memory, the instructions being executable to:
      simulate a decrease in signal quality of a forward link while operating in the first communications system;
      start a first timer with a first time period and a second timer with a second time period, wherein the first timer and the second timer are associated with the first communications system;
      transition to the second communications system;
      perform one or more tasks associated with monitoring a paging channel of the second communications system: and
      transition to an inactive state if the one or more tasks are not performed before the expiration of the combination of the first time period and the second time period.

8. The wireless device of claim 7, wherein the wireless device is a handset.

9. The wireless device of claim 7, wherein the decrease in signal quality is simulated by setting a data rate control (DRC) value and a DRC cover to zero.

10. The wireless device of claim 7, wherein the first communications system is a data communications system.

11. The wireless device of claim 7, wherein the second communications system is a voice communications system.

12. The wireless device of claim 7, wherein the first timer is a DRC supervision timer.

13. The wireless device of claim 7, wherein the second timer is a Reverse Channel Traffic Restart Timer.

14. An apparatus for transitioning between a first communications system and a second communications system, comprising:
   means for simulating a decrease in signal quality of a forward link while operating in the first communications system;
   means for starting a first timer with a first time period and a second timer with a second time period, wherein the first timer and the second timer are associated with the first communications system;
   means for transitioning to the second communications system;
   means for performing one or more tasks associated with monitoring a paging channel of the second communications system; and
   means for transitioning to an inactive state if the one or more tasks are not performed before the expiration of the combination of the first time period and the second time period.

15. The apparatus of claim 14, wherein the decrease in signal quality is simulated by setting a data rate control (DRC) value and a DRC cover to zero.

16. The apparatus of claim 14, wherein the first communications system is a data communications system.

17. The apparatus of claim 14, wherein the second communications system is a voice communications system.

18. The apparatus of claim 14, wherein the first timer is a DRC supervision timer.

19. The apparatus of claim 14, wherein the second timer is a Reverse Channel Traffic Restart Timer.

* * * * *